United States Patent
Fujiwara

(10) Patent No.: US 6,731,776 B1
(45) Date of Patent: May 4, 2004

(54) IMAGE RECORDING APPARATUS

(75) Inventor: Keiji Fujiwara, Hyogo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 560 days.

(21) Appl. No.: 09/691,134

(22) Filed: Oct. 19, 2000

(30) Foreign Application Priority Data

Feb. 2, 2000 (JP) ........................................ 2000-025298

(51) Int. Cl.$^7$ ................................................. G06K 9/00
(52) U.S. Cl. ....................... 382/100; 380/283; 713/176; 358/1.15; 358/3.28
(58) Field of Search ........................ 382/100; 713/176, 713/175, 200, 3.28; 358/1.15, 540, 450; 380/283

(56) References Cited

U.S. PATENT DOCUMENTS

| | | | | |
|---|---|---|---|---|
| 5,568,570 A | * | 10/1996 | Rabbani .................... 382/238 |
| 5,829,895 A | * | 11/1998 | Hayashi et al. ........ 400/124.05 |
| 6,301,013 B1 | * | 10/2001 | Momose et al. ........... 358/1.15 |
| 6,351,815 B1 | * | 2/2002 | Adams ....................... 713/200 |
| 6,427,020 B1 | * | 7/2002 | Rhoads ...................... 382/100 |
| 6,490,683 B1 | * | 12/2002 | Yamada et al. ............. 713/176 |
| 6,526,155 B1 | * | 2/2003 | Wang et al. ................ 382/100 |
| 6,556,688 B1 | * | 4/2003 | Ratnakar .................... 382/100 |
| 6,580,435 B1 | * | 6/2003 | Lippincott .................. 345/629 |
| 2001/0034835 A1 | * | 10/2001 | Smith ........................ 713/175 |

FOREIGN PATENT DOCUMENTS

| | | |
|---|---|---|
| JP | 60-140387 | 7/1985 |
| JP | 10-40399 | 2/1998 |

* cited by examiner

*Primary Examiner*—Timothy M. Johnson
*Assistant Examiner*—Barry Choobin
(74) *Attorney, Agent, or Firm*—Staas & Halsey LLP

(57) ABSTRACT

An image recording apparatus prints a visible watermark superimposed over an original image on recording paper. The apparatus includes a first memory for storing watermark print information, a second memory for storing watermark effective data, a third memory for storing original image data, an original image data reader for reading out the original image data from the third memory, and a watermark data reader for reading out the watermark effective data based on the watermark print information.

8 Claims, 10 Drawing Sheets

FIG.8

×××SURVEY REPORT

1. CIRCUMSTANCES

------

------

2. CASE STUDY

------

------

------

3. MARKET SCALE

------

------

------

4. PROSPECT

------

------

------

5. REFERENCES

------

IMAGE RECORDING APPARATUS

BACKGROUND OF THE INVENTION

1. Field of the Invention

The present invention relates to an image recording apparatus for printing a visible watermark superimposed over an original image on recording medium.

2. Description of the Related Art

Recently, various types of multi-functional printers suitable for use at home, workplaces, etc. have been put on the market. Among these, printers intended to be used mainly at business offices are often provided with special functions such as "watermark" printing. A watermark is a faint design made in recording medium together with other substantial images printed on the recording medium. By employing this function, a phrase such as "Top Secret" or "Draft" may be printed on recording paper together with the original images (i.e., text, pictures, etc). FIG. 8 of the accompanying drawings shows an example of watermark (consisting of two Chinese characters meaning "top secret") superimposed over the original images, such as "3. MARKET SCALE", "4. PROSPECT", and the accompanying text.

Conventionally, two different pieces of print data may be combined by using a function called "Overlay" or "Form Overlay." By this function, as shown in FIG. 9 or 10, overlay data representing a table of a prescribed format may be superimposed over the original data to be filled in the table.

Specifically, the first technique shown in FIG. 9 makes use of a single full-page bitmap memory. In this method, the command-formed overly data supplied from a host computer is stored in a overlay data memory, while the documental (original) data is stored in a documental data memory. Then, the documental data is unfolded (converted) into bit-mapped data to be stored in the bitmap memory. Thereafter, the command-formed overlay data is converted into bit-mapped data and then superimposed over the bit-mapped documental data in the bitmap memory.

The other technique shown in FIG. 10 utilizes two full-page bitmap memories for storing the overlay data and the documental data, respectively. These two kinds of bit-mapped data are added by an OR circuit before being supplied to the print engine.

Each of the techniques described above is applicable to printing a watermark over an original image. For this, the formatted table data is simply replaced with the desired watermark data. However, this may give rise to the following disadvantages.

Specifically, according to the method shown in FIG. 9, the logical sum calculation for superimposing the watermark data over the original image data in the bitmap memory is performed with respect to all of the pixels for the entire page. Further, this logical sum calculation is performed as the command-formed water mark data is being unfolded into the bit-mapped data. Disadvantageously, such designing tends to make the printing speed unduly slow.

The method shown in FIG. 10, on the other hand, requires at least two full-page bitmap memories, which may lead to an unfavorable cost increase. Further, the watermark to be printed is typically much smaller than the print surface of the recording medium. This means that the watermark print data is present only in a small part of the watermark bitmap memory. This is a waste of the capacity of the watermark memory.

SUMMARY OF THE INVENTION

The present invention has been proposed under the circumstances described above, and its object is to provide an image recording apparatus capable of performing high-speed watermark printing without unduly increasing the capacity of required memory.

According to the present invention, there is provided an image recording apparatus for printing a visible watermark superimposed over an original image on recording medium. The recording apparatus includes: a first memory for storing watermark print information including positional data of the watermark; a second memory for storing watermark effective data; a third memory for storing original image data; an original image data reader for reading out the original image data from the third memory; and a watermark data reader for reading out the watermark effective data based on the watermark print information, wherein the read-out watermark effective data is superimposed over the read-out original image data.

With such an arrangement, the second memory does not need to have a large capacity since only the effective data of the watermark is stored therein.

According to a preferred embodiment, the watermark print information may include watermark print start raster line data watermark print start position data for raster lines, watermark print length data for the respective raster lines, and watermark print end flag. The watermark print length data may correspond to the watermark effective data. More specifically, the watermark print length data may represent the length of the watermark effective data.

Preferably, the image recording apparatus of the present invention may further comprise a watermark storage controller for causing the watermark print information to be stored in the first memory and for causing the watermark effective data to be stored in the second memory.

Preferably, the watermark print information may be obtained by preparing bit-mapped data of the watermark.

Preferably, the image recording apparatus of the present invention may further comprise original image data unfolding means for generating bit-mapped data of the original image in the third memory.

Preferably, the image recording apparatus of the present invention may further comprise an additional memory for storing the original image data read out from the third memory.

Preferably, the image reading apparatus of the present invention may further comprise an OR circuit for calculating logical sum of the watermark effective data and the original image data. With the use of such an OR circuit, the watermark effective data may not need to be superimposed on the original image data in a memory. Thus, no additional memory is needed, and high-speed superimposing performance with the watermark data and the original image data is achieved.

Preferably, the image reading apparatus of the present invention may further comprise a semiconductor memory chip, wherein at least two of the first, the second and the third memories are provided by mutually different storage regions of the semiconductor memory chip.

Other features and advantages of the present invention will become apparent from the detailed description given below with reference to the accompanying drawings.

BRIEF DESCRIPTION OF THE DRAWINGS

FIG. 8 shows an example of watermark superimposed over the original or background image printed on recording paper;

DETAILED DESCRIPTION OF THE PREFERRED EMBODIMENTS

The preferred embodiment of the present invention will be described below with reference to the accompanying drawings.

Figure 1:
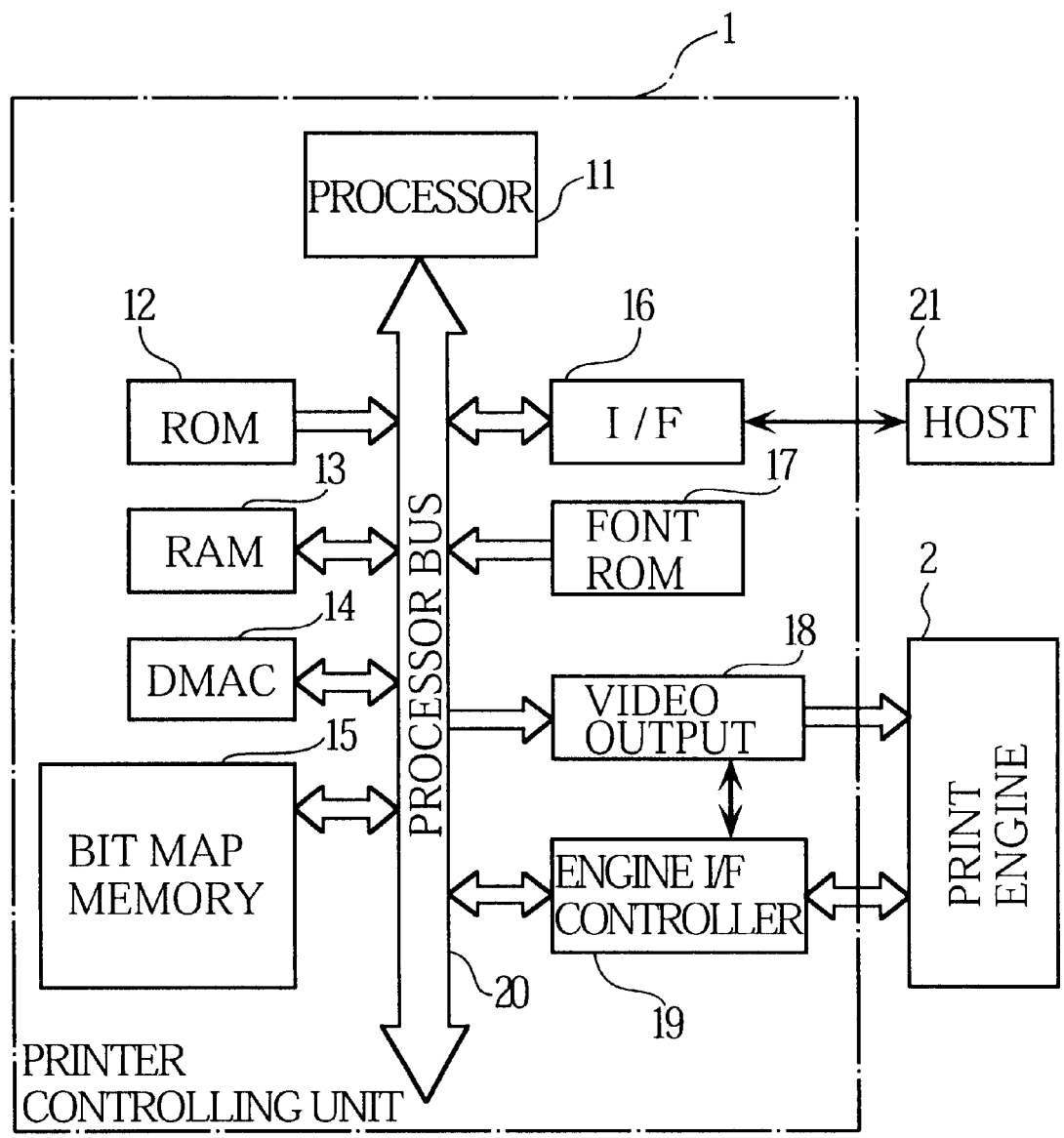
FIG. 1 is a block diagram showing the principal components of a printer incorporating an image recording apparatus embodying the present invention.

FIG. 1 is a block diagram showing the principle components of a printer incorporating an image recording device embodying the present invention. The illustrated printer is provided with a printer controlling unit 1 and a print engine 2. The printer controlling unit 1 controls the overall operation of the printer. The print engine 2 performs printing on e.g. recording paper based on print data supplied from the printer controlling unit 1.

As shown in FIG. 1, the printer controlling unit 1 includes a processor 11, a ROM (read only memory) 12, a RAM 13 (random access memory), a DMAC (direct memory access controller) 14, a bitmap memory 15, a peripheral interface 16, a font ROM 17, a video output section 18 and an engine interface controller 19.

The processor 11 is connected, via a processor bus 20, to the ROM 12, the RAM 13, the DMAC 14, the bitmap memory 15, the peripheral interface 16, the font ROM 17, the video output section 18 and the engine interface controller 19. The video output section 18 and the engine interface controller 19 are connected to each other and also to the print engine 2. The peripheral interface 16 is connected to a host computer 21. The RAM 13 and the bitmap memory 15 are provided by two different storage regions, respectively, of one memory chip such as a DRAM (dynamic random access memory).

The processor 11 controls the overall operation of the printer controlling unit 1.

The ROM 12 stores e.g. programs for driving the processor 11 and various kinds of initial or presetting data.

The RAM 13 stores various kinds of data such as watermark record information, and also provides a work region for the operation of the processor 11.

The DMAC 14 accesses the bitmap memory 15, under the control of the processor 11, for writing image data to the memory 15 or reading the stored image data from the memory 15.

The bitmap memory 15 stores two different kinds of data. One is bit-mapped data for a documental image, and the other is watermark effective data which is also bit-mapped.

The peripheral interface 16 controls the transmission between the processor 11 and the host computer 21.

The font ROM 17 stores font data.

The video output section 18 produces print data in accordance with the watermark record information stored in the RAM 13. As will be described below, the print data is produced by superimposing the above-mentioned documental image (bit-mapped) and watermark effective data (bit-mapped). The thus produced print data is supplied to the print engine 2 by the video output section 18.

The engine interface controller 19 controls the video output section 18 in accordance with information supplied from the processor 11 and the print engine 2.

The host computer 21 supplies command-formed documental image data and command-formed watermark data to the processor 11 via the peripheral interface 16. Simultaneously with these data, the host computer 21 supplies certain commands such as a print instruction to the processor 11.

Figure 2:
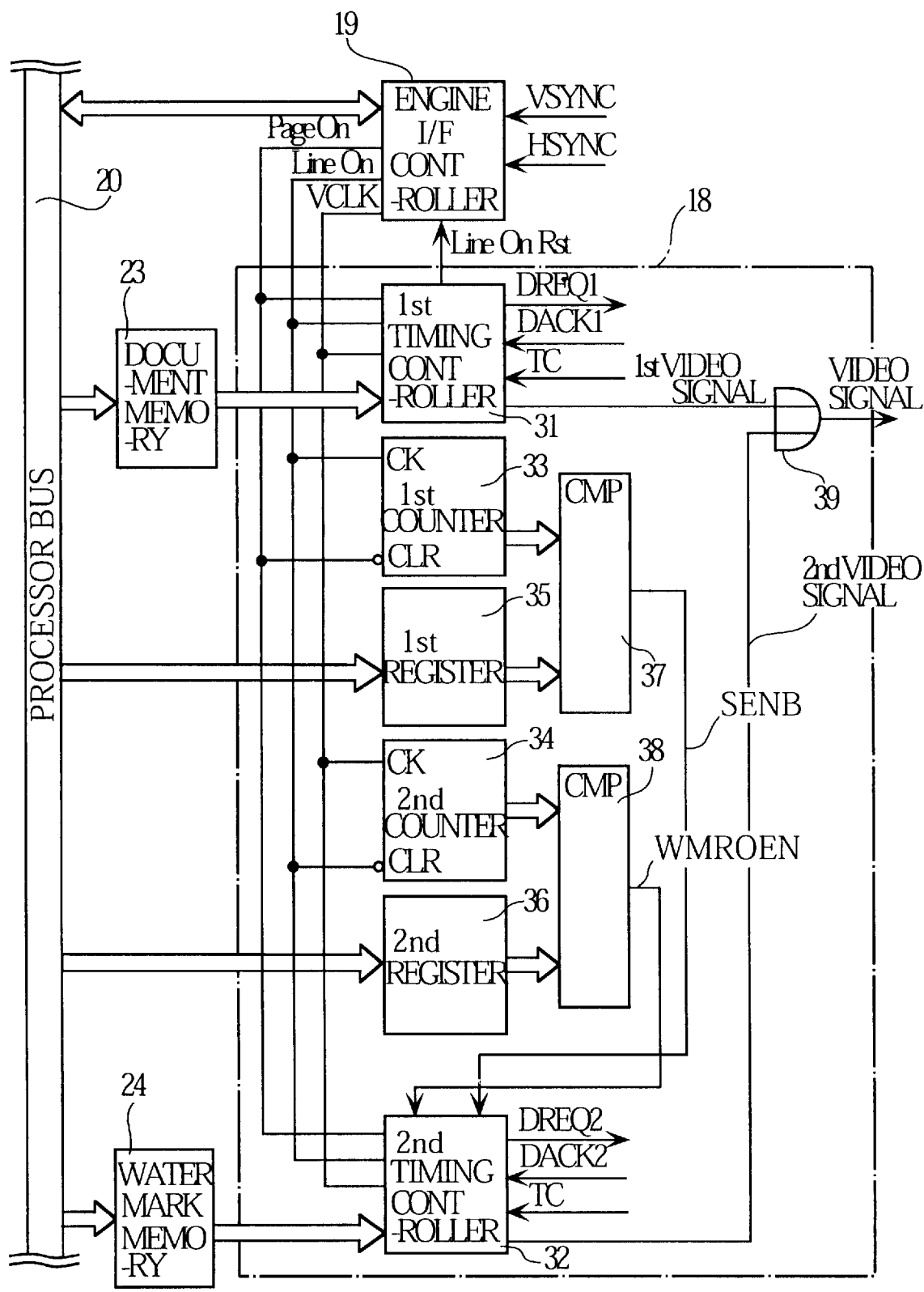
FIG. 2 is a block diagram showing the details of the video output section of the printer.

Referring to FIG. 2, the details of the video output section 18 are shown in a block diagram. As illustrated, the video output section 18 is provided with a first timing controller 31, a second timing controller 32, a first counter 33, a second counter 34, a first register 35, a second register 36, a first comparing circuit 37, a second comparing circuit 38 and an OR circuit 39.

The first timing controller 31 is connected to a documental image memory 23 to store bit-mapped documental image data, while the second timing controller 32 is connected to a watermark memory 24 to store bit-mapped watermark effective data. The documental image memory 23 and the watermark memory 24 are realized by two different storage regions (one storage region for either the memory 23 or memory 24) of the bitmap memory 15.

The first timing controller 31, controlled by the engine interface controller 19, is initiated to read out the documental image data from the memory 23. This readout data is supplied as a first video signal to the OR circuit 39.

The second timing controller 32, controlled by the first comparing circuit 37, second comparing circuit 38 and engine interface controller 19, reads out the watermark effective data from the watermark memory 24. This readout data is supplied as a second video signal to the OR circuit 39.

The first counter 33 counts signals "LineOn" from the engine interface controller 19, and then supplies the resulting count number to the first comparing circuit 37.

The second counter 34 counts signals "VCLK" from the engine interface controller 19, and then supplies the resulting count number to the second comparing circuit 38.

The first register 35 stores positional data supplied from the processor 11 via the processor bus 20. The positional data specifies the print start line for the watermark to be printed on the page.

The second register 36 also stores positional data supplied from the processor 11 via the processor bus 20. Based on this positional data, the print start position for printing the watermark is specified for each raster line.

The first comparing circuit 37 compares the count number from the first counter 33 with the preset value stored in the first register 35. When the count number is equal to or greater than the preset value, the first comparing circuit 37 supplies a send-enabling signal "SENB" to the second timing controller 32.

The second comparing circuit 38 compares the count number from the second counter 34 with the preset value stored in the second register 36. When the count number is equal to or greater than the preset value, the second comparing circuit 38 supplies a line transmission start timing signal "WMROEN" to the second timing controller 32.

The OR circuit 39 calculates the logical sum of the first video signal from the first timing controller 31 and the second video signal from the second timing controller 32. The result of the calculation is supplied as print data to the print engine 2 from the OR circuit 39.

Figure 3:
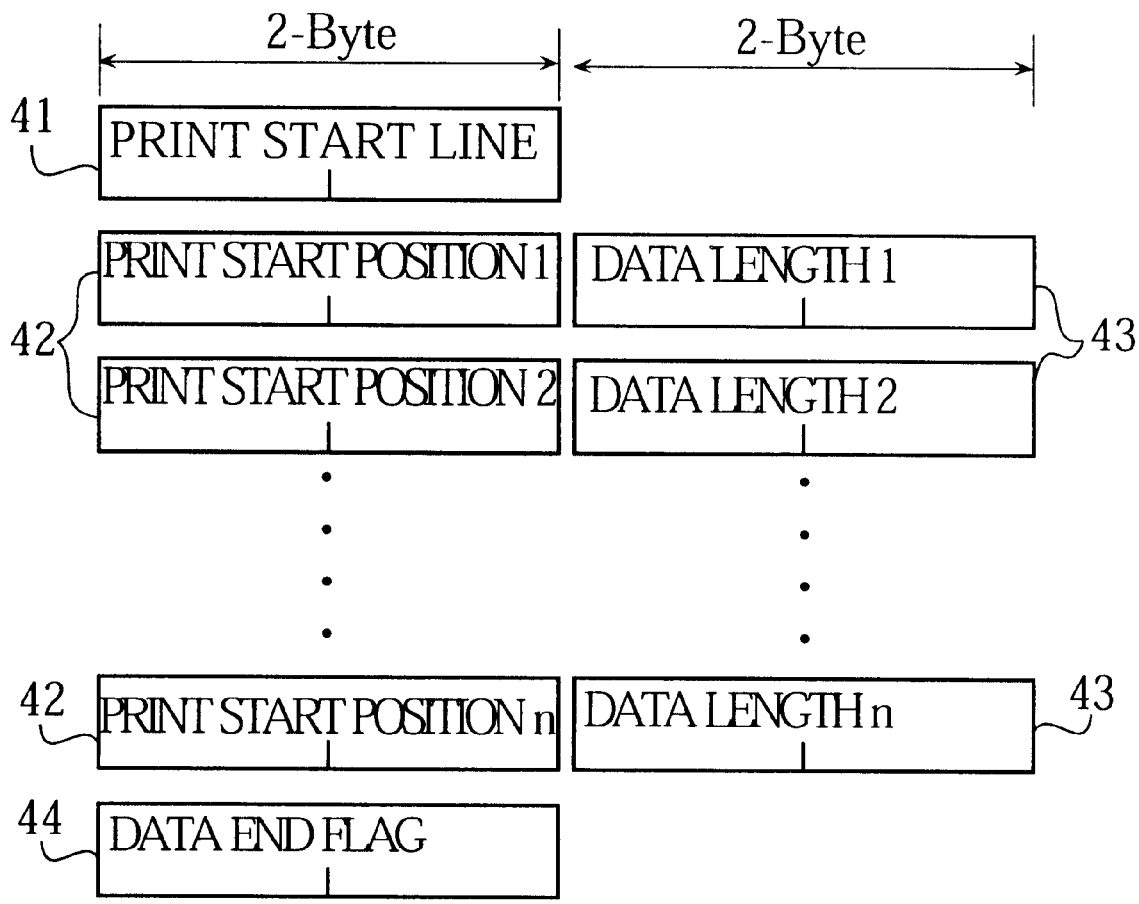
FIG. 3 illustrates the content of the watermark print information stored in the RAM of the printer.

Referring now to FIG. 3, The content of the watermark record information stored in the RAM 13 is schematically shown. As illustrated, the watermark record information contains several pieces of 2-byte data, such as print start line data 41, print start position data 42, length data 43 and data end flag 44.

The print start line data 41 specifies one raster line in one page at which the desired watermark printing should be started. The print start position data 42 specifies the position, in each raster line, at which the watermark printing should be started. As illustrated, each piece of the print start position data 42 is accompanied by an additional piece of data 43 representing the length of the effective data of the watermark for the relevant raster line. Here, the effective data may be "1,0, . . . , 0, 1" or "1,1,0, . . . , 1" for example. It should be noted here that the both ends (the underlined parts) of any effective data are "1", while the other or intermediate part may contain "0" or "1", depending on the watermark to be printed.

The data end flag 44 indicates the end of the watermark record information. In the preferred embodiment, the data end flag 44 is "FFFF" in the hexadecimal number system. When the data end flag 44 is read out by the processor 11, then no watermark effective data will be read out from the watermark memory 24.

Figure 4:
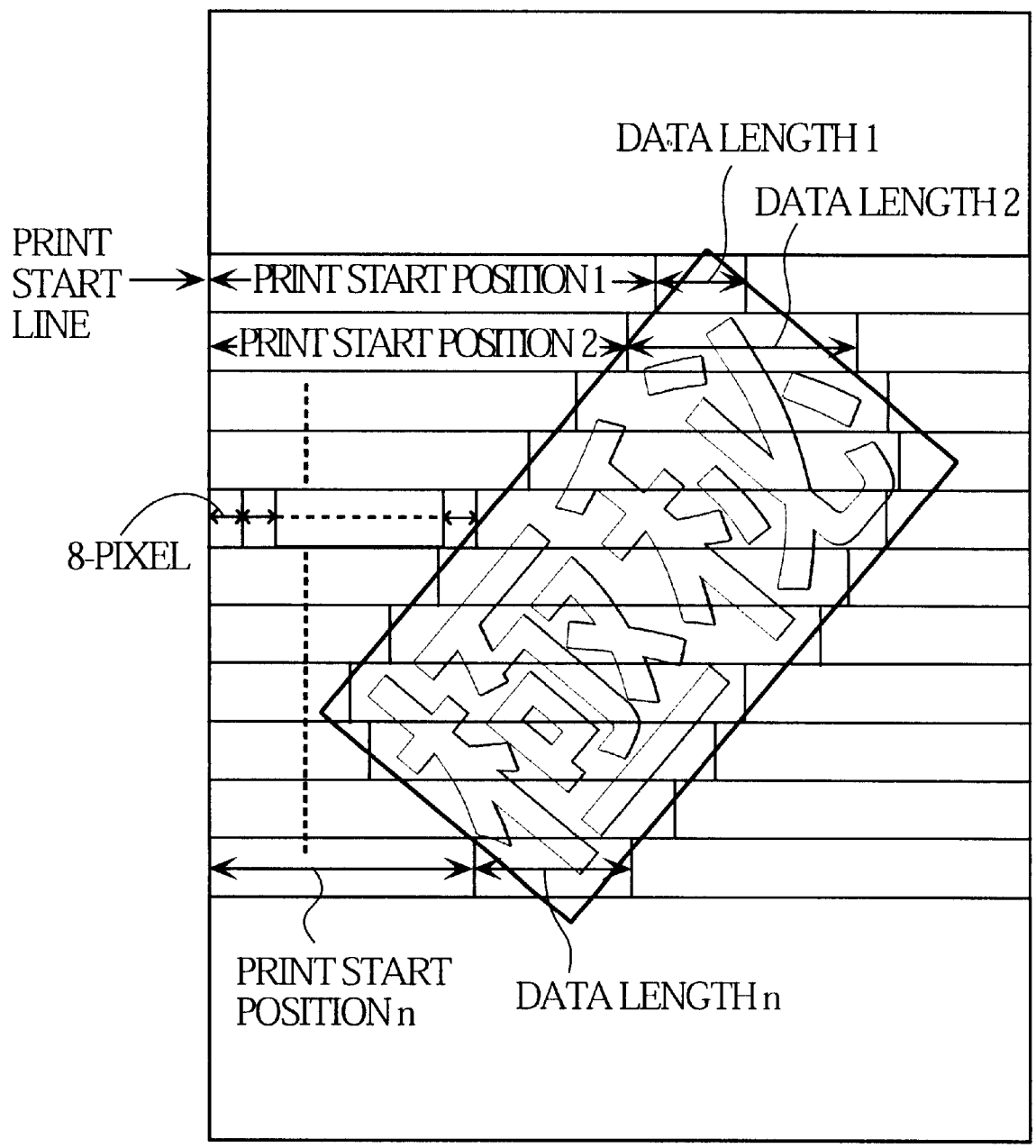
FIG. 4 illustrates how the watermark print information is related to the watermark to be printed on recording paper.

FIG. 4 illustrates how watermark record information is related to a watermark printed on recording paper. The depicted watermark consists of two large Chinese characters or "kanji" printed skew on the recording paper sheet. The printed Chinese characters are "極秘" meaning "top secret." For clarity of illustration, the documental images printed on the paper sheet are omitted in the figure. Here, the "documental images" refer to texts, figures, graphics, etc. which constitute the substantial content of the document In this definition, the "watermark" is not a documental image, since it is not related to the substantial content of the document, but merely expresses the status or nature of the document, informing the reader how to treat the document. The "documental images" may be paraphrased as "original images" upon which the watermark is superimposed.

As shown in FIG. 4, the print start line data specifies a particular one of the raster lines at which the printing dots of the watermark make the first appearance in the page. The print start position data (1–n) specifies the initial position at which the printing dots of the watermark make the first appearance in a selected one of the raster lines.

The above-mentioned initial position in each raster line may not be specified by the unit of one pixel but by the unit of two or more consecutive pixels in the line. In the preferred embodiment shown in FIG. 4, every eight consecutive pixels constitute the unit for specifying the position, though the present invention is not limited to this. What number of pixels constitute the unit may depend upon the design of the watermark memory 24. For instance, when the watermark memory 24 is designed so that N-bit image data is collectively written to or read out from the memory 24, the same number of pixels (i.e., N pixels) may constitute the unit. In the illustrated embodiment, the watermark memory 24 is designed to handle 1-byte data at a time. Thus, every eight consecutive pixels in each raster line are treated as one unit for specifying the starting position of the watermark.

According to the preferred embodiment, the data length (1–n) of the effective watermark data is also expressed by the unit of eight consecutive pixels.

Figure 5:
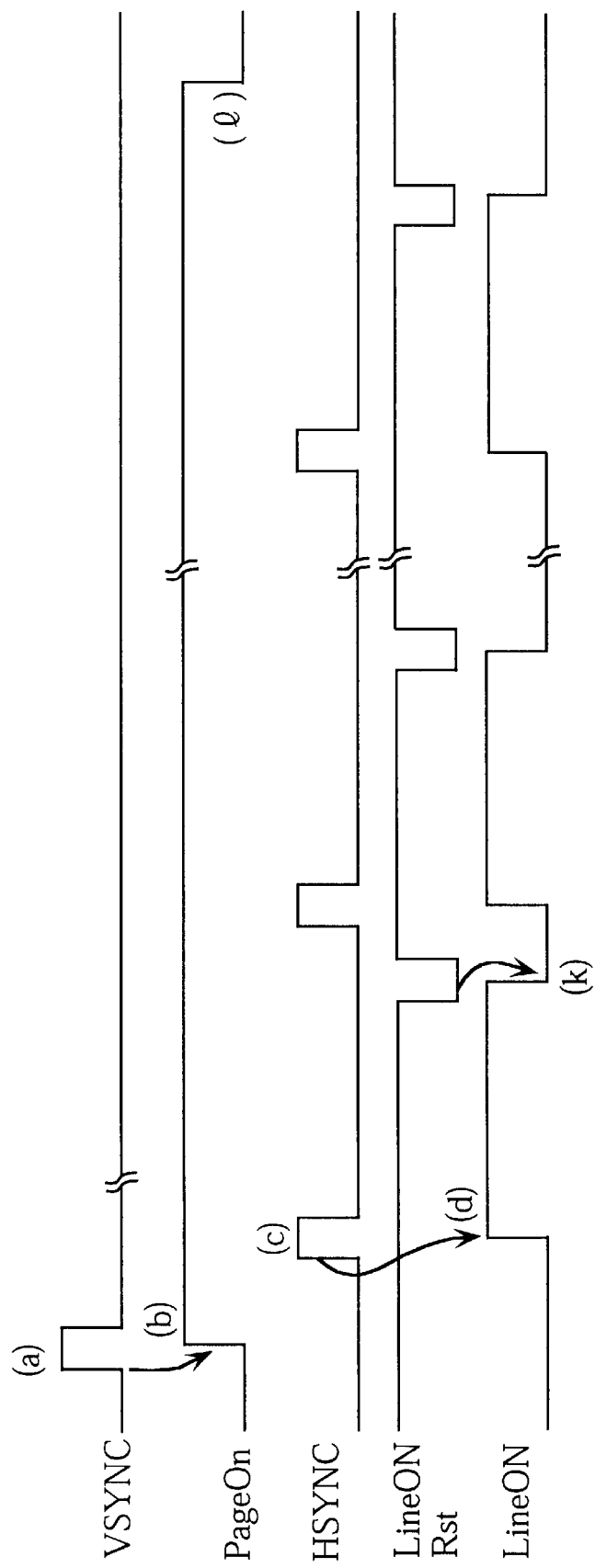
FIG. 5 is a timing chart showing signals supplied to or from the engine interface controller of the printer.
Figure 6:
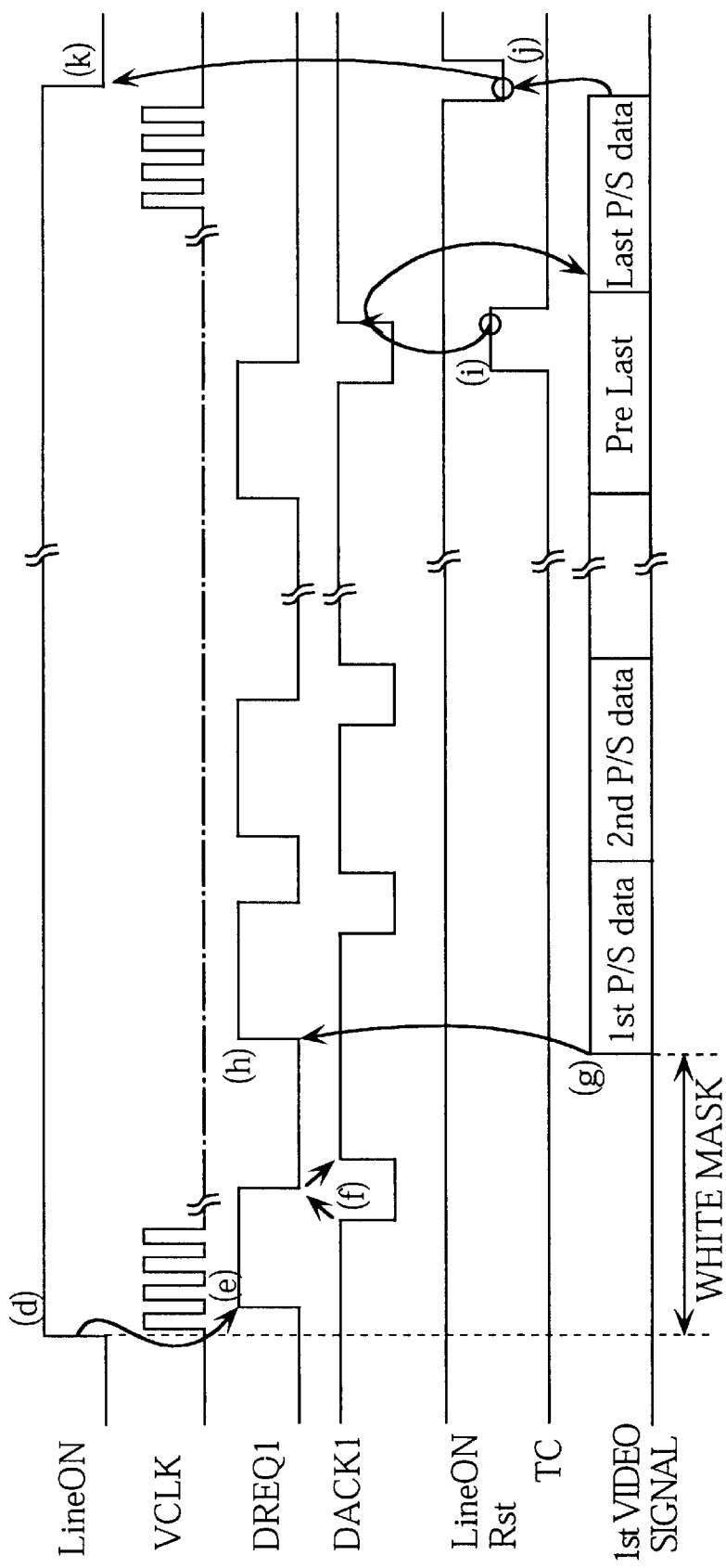
FIG. 6 is a timing chart showing signals supplied to or from the first timing controller of the video output section shown in FIG. 2.
Figure 7:
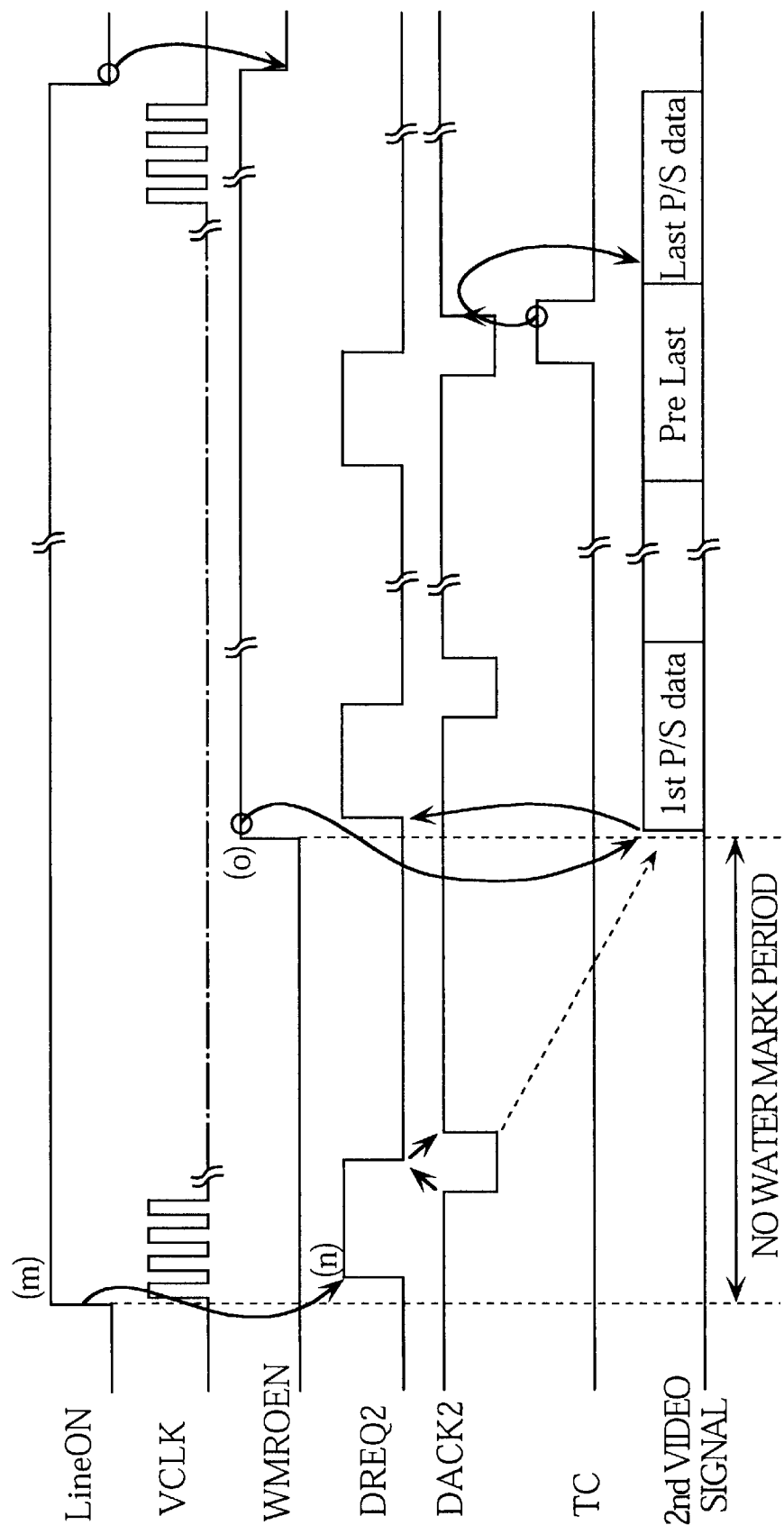
FIG. 7 is a timing chart showing signals supplied to or from the second timing controller of the video output section shown in FIG. 2.

Reference is now made to FIGS. 5–7 to describe the operation of the image recording apparatus of the present invention. FIG. 5 is a timing chart for the signals supplied to or from the engine interface controller 19. FIG. 6 is a timing chart for the signals supplied to or from the first timing controller 31. FIG. 7 is a timing chart for the signals supplied to or from the second timing controller 32.

When the watermark command data is issued by the host computer 21, this data is supplied to the processor 11 via the peripheral interface 16. Then the processor 11 will unfold or spread the command data. Specifically, the processor 11 causes the supplied watermark command data to be converted into bit-mapped data. As the watermark command data is being unfolded, the processor 11 generates watermark record information, and stores this information in the RAM 13. The processor 11 also causes the bit-mapped watermark effective data to be stored in the watermark memory 24. Further, the processor 11 unfolds the documental image command data supplied from the host computer 21, and then causes the obtained bit-mapped data of the documental image to be stored in the documental image memory 23.

Thereafter, the processor 11 issues print control commands to the print engine 2 via the engine interface controller 19. Upon receiving these commands, the print engine 2 picks a recording paper sheet from a hopper (not shown). When the recording paper sheet is brought to the prescribed print ready position in the print engine 2, this print engine asserts a "VSYNC" signal (see (a) in FIG. 5) thereby informing the engine interface controller 19 that video signal transmission can now be started.

In response to this, the engine interface controller 19 asserts a "PageOn" signal, as shown by (b) in FIG. 5. Then, when a signal "HSYNC" supplied from the print engine 2 is asserted (see (c) in FIG. 5), the engine interface controller 19 asserts a "LineOn" signal (see (d) in FIG. 5). Here, the signal HSYNC is a video transmission synchronizing signal to be supplied for each raster line after the print engine 2 is actuated.

When the VSYNC signal is asserted, the processor 11 will detect this assertion via the engine interface controller 19. Then, the bit-mapped data of the documental image and the watermark will be supplied, as video signals, to the print engine 2. For achieving this, the processor 11 sets various parameters, as described below, while also permitting the DMAC 14 to transmit data.

Specifically, under the control of the processor 11, the head address of the first raster line of the bit-mapped documental image data (stored in the documental image memory 23) is set in a first channel of the DMAC 14. Together with the head address, the data length of the first raster line is also set in the first channel of the DMAC 14. Further, the print start line data is set in the first register 35, while the print start position data is set in the second register 36.

Further, the head address of the bit-mapped watermark data for the first raster line is set in a second channel of the DMAC 14. Together with this head address, the data length of the effective data of the watermark is also set in the second channel of the DMAC 14.

When the LineOn signal is asserted (see (d) in FIGS. 5 and 6) by the engine interface controller 19, the first timing controller 31 asserts a data writing request signal "DREQ1" (see (e) in FIG. 6) supplied to the DMAC 14. Correspondingly, the DMAC 14 causes the head address stored in the first channel of the DMAC 14 to be supplied to the documental image memory 23. Together with this head address, a read signal is supplied to the documental image memory 23. Then, the documental image memory 23 will output the first piece of bit-mapped data for the first raster line, while also asserting a "DACK1" signal (see (f) in FIG. 6) supplied to the first timing controller 31. Upon this, the first timing controller 31 temporarily stores the first piece of bit-mapped documental image data supplied from the documental image memory 23.

As shown in FIG. 6, a "white mask" procedure is performed for a predetermined time, starting from the head of the raster line, so that the required printing is to be performed within the prescribed printable area. The period of the white mask procedure is controlled by a value to be set in the first timing controller 31 by the processor 11 at the time of starting the printing operation.

After the white mask period has lapsed (see (g) in FIG. 6), the first piece of bit-mapped documental image data stored in the first timing controller 31 is subjected to parallel-serial conversion by the first timing controller 31. Then, in response to each clock of the video clock signal "VCLK" supplied from the engine interface controller 19, one bit of the converted first piece of data (1st P/S data in FIG. 6) is supplied as the first video signals to the OR circuit 39 from the first timing controller 31.

After the data transmission of the 1st P/S data is started, the first timing controller 31 asserts the data writing request signal "DREQ1" (see (h) in FIG. 6) supplied to the DMAC 14. This causes the DMAC 14 to supply both the head address of the next or second piece of bit-mapped documental image data and a read signal to the documental data memory 23.

Thereafter, in the same manner as described above, the documental data memory 23 outputs the second piece of bit-mapped data for the first raster line, which will be temporarily stored in the first timing controller 31. There, the second piece of bit-mapped data is converted into the "2nd P/S data" shown in FIG. 6, which will then be supplied to the OR circuit 39 in response to the video clock signal "VCLK" from the engine interface controller 19.

As readily understood, the same operations will be repeated until the last piece of data for the first raster line is outputted from the documental image memory 23 to the first timing controller 31.

When the last data of the first raster line is supplied from the documental image memory 23 to the first timing controller 31, the DMAC 14 asserts the terminal count signal "TC" (see (i) in FIG. 6) supplied to the first timing controller 31. Upon this, the first timing controller 31 recognizes the next piece of data as the last data of the raster line. As with the previous pieces of data, this last data is subjected to parallel-serial conversion by the first timing controller 31. However, in supplying the converted last piece of data to the OR circuit 39, the first timing controller 31 does not assert the data writing request signal DREQ1 to the DMAC 14. Then, after outputting the last bit of the converted serial data to the OR circuit 39, the first timing controller 31 asserts the "LineOnRst" signal (see (j) in FIG. 6) supplied to the engine interface controller 19. As a result, the "LineOn" signal is negated (see (k) in FIGS. 6 and 5) by hardware. This ends the processing of the first raster line of the documental image data.

After the processing of the first raster line is completed, the processor 11 will set the required parameters for the next raster line in the same manner as for the first raster line. Also, the processor 11 will permit the DMAC 14 to transfer the bit-mapped documental image data. It should be noted here that the setting of the print start line data is performed only once for each page (not for every raster line of the same page). Thereafter, the next or second raster line will be processed in the same manner as with the first raster line. As readily understood, the above procedure is repeated until one page of the documental image is printed on the recording paper. To end the printing for the page, the processor 11 controls the engine interface controller 19, causing the "PageOn" signal to be negated (see (l) in FIG. 5).

The printing operation of the water mark may be performed in the following manner.

The first counter 33 counts the raster lines by counting the "LineOn" signals supplied from the engine interface controller 19. When the count number of the first counter 33 becomes equal to the value of the print start line data 41 stored in the first register 35, the first comparing circuit 37 asserts the send-enabling signal (SENB) supplied to the second timing controller 32, thereby initiating the operation of the second timing controller 32. Then, when the "LineOn" signal from the engine interface controller 19 is asserted (see (m) in FIG. 7), the second timing controller 32 asserts a data writing request signal "DREQ2" (see (n) in FIG. 7) supplied to the DMAC 14. Upon this, the DMAC 14 reads out the first piece of data of the watermark for the first line from the watermark memory 24, and stores it in the second timing controller 32.

In the above manner, no data will be read out from the watermark memory 24 when the system is dealing with the "watermark-absent" raster lines located before the particular raster line which is specified by the print start line data 41.

When the count number of the second counter 32 (which counts the bit number of the data for each raster line by counting the "VCLK" signals from the engine interface controller 19) is equal to the value represented by the print start position data 42 stored in the second register 36, the second comparing circuit 38 asserts the line transmission start timing signal "WMROEN" (see (o) in FIG. 7) supplied to the second timing controller 32. Thus, the second timing controller 32 subjects the bit-mapped watermark data to parallel-serial conversion. Then, the converted data is supplied as the second video signal to the OR circuit 39 based on the video clock signal "VCLK" from the engine interface controller 19. More accurately, one bit of the converted data is supplied to the OR circuit 39 in response to one clock of the video clock signal. In this manner, the start of transmission of the second video signal from the second timing controller 32 is delayed, whereby the effective data of the watermark will be supplied to the OR circuit 39 on time.

The above-described operation is repeated for every raster line. Then, upon reading out the data end flag 44 from the RAM 13, the processor 11 will cause the flag 44 to be set in the first register 35. In addition, the processor 11 will terminate both the parameter setting for the second channel of the DMAC 14 and the permission of data transmission. Consequently, the send-enabling signal "SENB" is negated, whereby no watermark data will be outputted from the second timing controller 32.

As stated above, the first video signal from the first timing controller 31 and the second video signal from the second timing controller 32 are both supplied to the OR circuit 39. Upon receiving these signals, the OR circuit 39 calculates their logical sum, and supplies the result (video signal) to the print engine 2. Consequently, the documental image together with the watermark properly superimposed will be printed on the recording paper.

Figure 9:
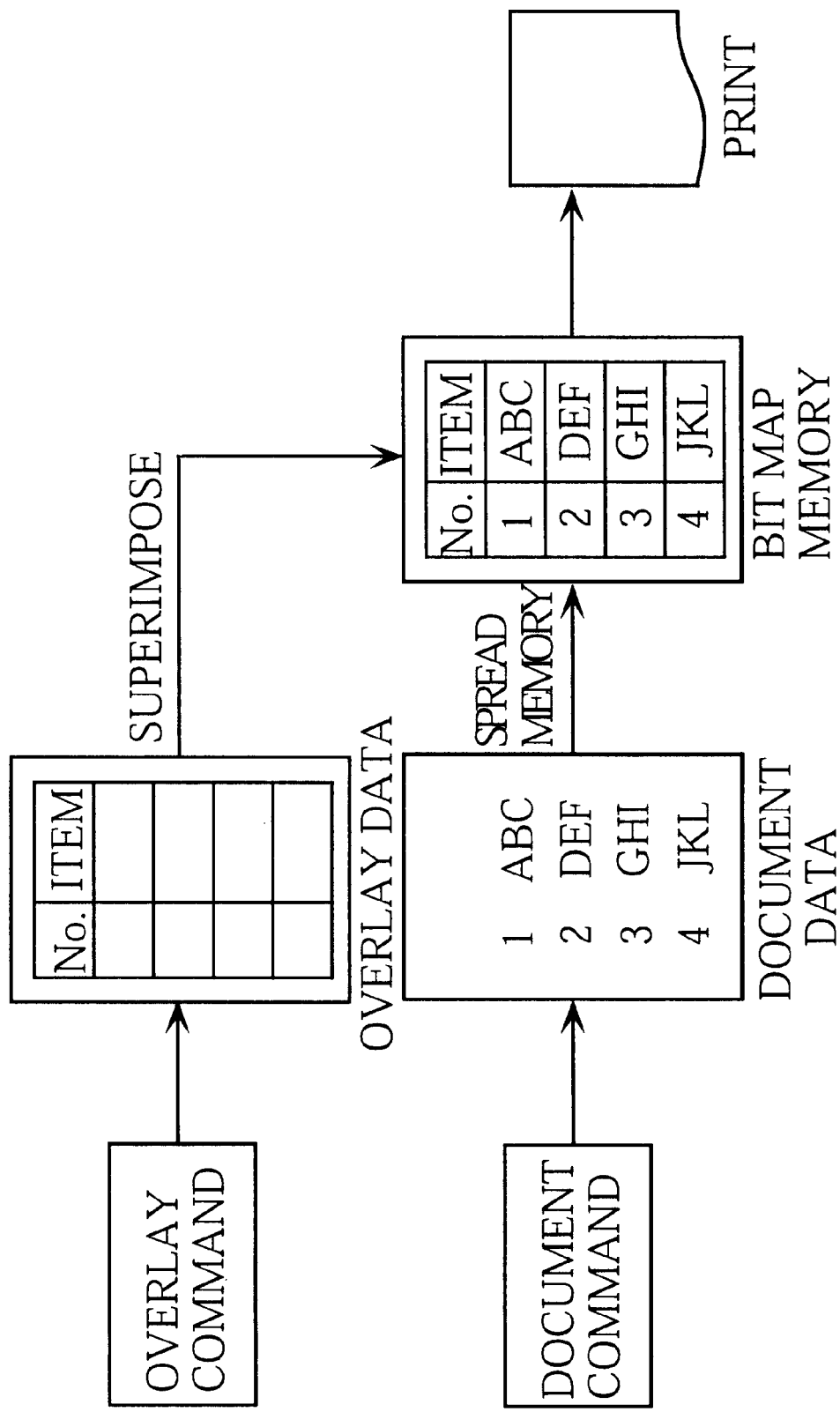
FIG. 9 illustrates how an image superimposing operation is performed in a conventional printer.
Figure 10:
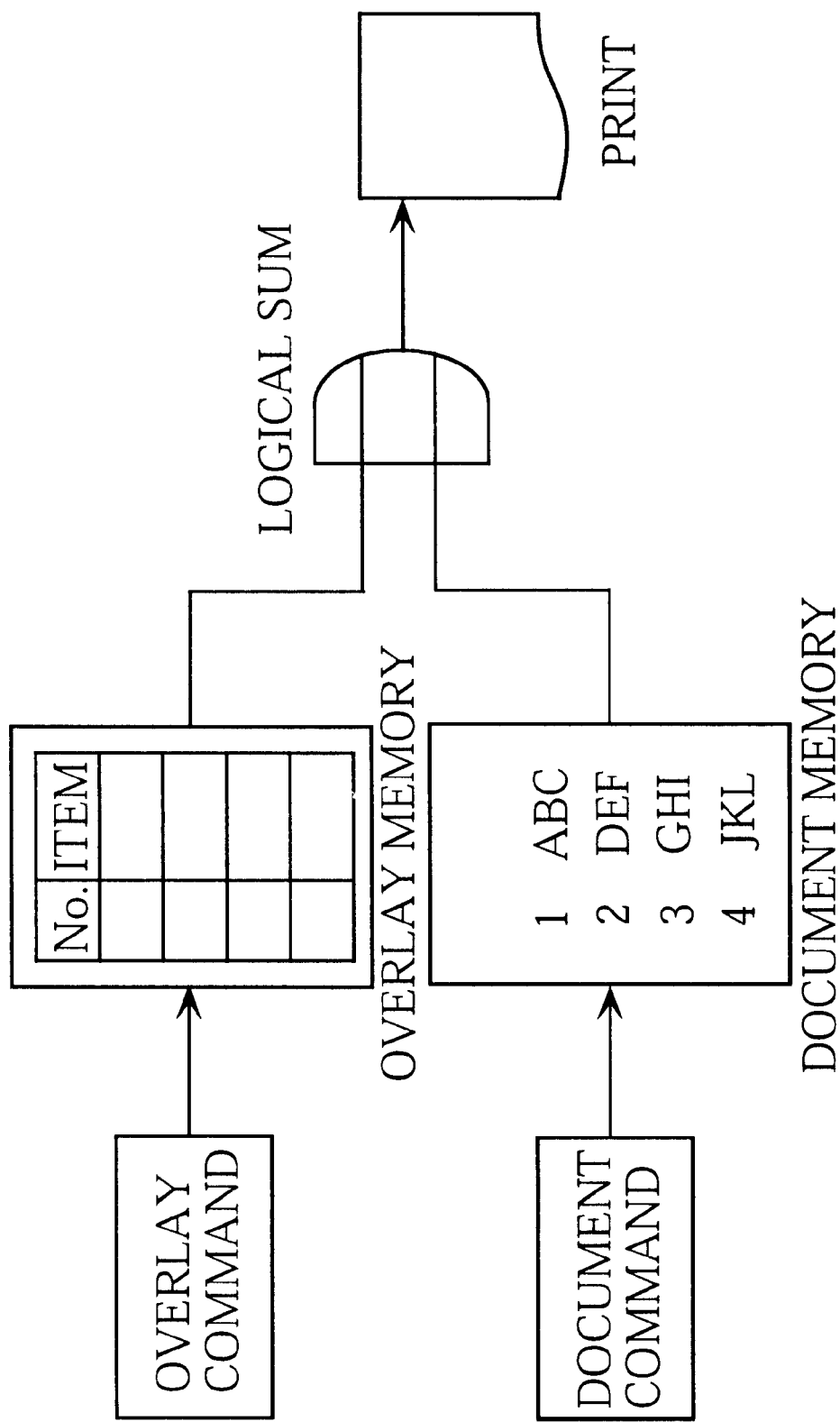
FIG. 10 illustrates how an image superimposing operation is performed in another conventional printer.

According to the above-described preferred embodiment, the processor 11 generates watermark record information and causes this to be stored in the RAM 13, as the command-formed watermark data is being unfolded into bit-mapped data. Further, the processor 11 causes only the effective data of the watermark to be stored in the watermark memory 24. Based on the watermark record information, this effective data is superimposed over the documental image data for performing the required printing. It should be appreciated here that since only the effective data of the watermark is stored, the watermark memory 24 does not need to have so large a capacity as to store data corresponding to all the pixels for the entire page, as opposed to the example shown in FIG. 10. Further, the superimposing of the bit-mapped watermark data and documental image data is not performed in a memory, as opposed to the other example shown in FIG. 9. Thus, the superimposing process of the preferred embodiment is performed at higher rate than is conventionally possible, thereby increasing the printing speed. Still further, the preferred embodiment can employ an outline (or scalable) font for depicting the watermark. Thus, it is possible to vary the watermark in size, color, posture or any other properties without causing the watermark to suffer from unacceptably palpable defects such as jaggy outlines.

In the above preferred embodiment, the image recording device of the present invention is depicted as being incorporated in a printer, though the present invention is not limited to this. For instance, the image recording device may be incorporated in a digital photocopier, facsimile machine or multi-functional device serving as both photocopier and facsimile machine.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An image recording apparatus for printing a visible watermark, superimposed over an original image, on a recording medium, the apparatus comprising:

a first memory for storing watermark print information including positional data of the watermark;

a second memory for storing watermark effective data;

a third memory for storing original image data;

an original image data reader for reading out the original image data from the third memory; and a watermark data reader for reading out the watermark effective data based on the watermark print information, the read-out watermark effective data being superimposed over the read-out original image data, wherein the watermark print information further comprises:

watermark print start raster line data, watermark print start position data for raster lines, watermark print length data for the respective raster lines, and a watermark print end flag.

2. The image recording apparatus according to claim 1, wherein the watermark print length data corresponds to the watermark effective data.

3. The image recording apparatus according to claim 1, further comprising a watermark storage controller for causing the watermark print information to be stored in the first memory and for causing the watermark effective data to be stored in the second memory.

4. The image recording apparatus according to claim 1, wherein the watermark print information is obtained by preparing bit-mapped data of the watermark.

5. The image recording apparatus according to claim 1, further comprising original image data unfolding means for generating bit-mapped data of the original image in the third memory.

6. The image recording apparatus according to claim 1, further comprising an additional memory for storing the original image data read out from the third memory.

7. The image reading apparatus according to claim 1, further comprising an OR circuit for calculating logical sum of the watermark effective data and the original image data.

8. The image reading apparatus according to claim 1, further comprising a semiconductor memory chip, wherein at least two of the first, the second and the third memories are provided by respective, mutually different storage regions of the semiconductor memory chip.

\* \* \* \* \*